US012602366B2

(12) United States Patent
Kong et al.

(10) Patent No.: US 12,602,366 B2
(45) Date of Patent: Apr. 14, 2026

(54) DISTRIBUTED TABLE LOCK APPLICATION METHODS, APPARATUSES, STORAGE MEDIA, AND ELECTRONIC DEVICES

(71) Applicant: Beijing Oceanbase Technology Co., Ltd., Beijing (CN)

(72) Inventors: Fanyu Kong, Beijing (CN); Xiaofei Cui, Beijing (CN); Fusheng Han, Beijing (CN); Ting Cao, Beijing (CN)

(73) Assignee: Beijing OceanBase Technology Co., Ltd., Beijing (CN)

( * ) Notice: Subject to any disclaimer, the term of this patent is extended or adjusted under 35 U.S.C. 154(b) by 42 days.

(21) Appl. No.: 18/494,268

(22) Filed: Oct. 25, 2023

(65) Prior Publication Data
US 2024/0134840 A1    Apr. 25, 2024
US 2024/0232161 A9    Jul. 11, 2024

(30) Foreign Application Priority Data

Oct. 25, 2022    (CN) .......................... 202211313874.3

(51) Int. Cl.
*G06F 16/23*        (2019.01)
*G06F 16/27*        (2019.01)
(52) U.S. Cl.
CPC .......... *G06F 16/2343* (2019.01); *G06F 16/27* (2019.01)
(58) Field of Classification Search
CPC .. G06F 16/2343; G06F 16/27; G06F 16/2282; G06F 11/1448
See application file for complete search history.

(56) References Cited

U.S. PATENT DOCUMENTS

| | | | | |
|---|---|---|---|---|
| 7,805,423 | B1 * | 9/2010 | Romine | ................ G06F 16/288 |
| | | | | 707/648 |
| 2019/0311057 | A1 * | 10/2019 | Sung | ................ G06F 16/24542 |
| 2023/0315713 | A1 * | 10/2023 | Liu | ..................... G06F 16/2343 |
| | | | | 707/704 |
| 2023/0385263 | A1 * | 11/2023 | Liu | ..................... G06F 16/2343 |

FOREIGN PATENT DOCUMENTS

| | | | | |
|---|---|---|---|---|
| CN | 109710629 | A | * | 5/2019 |
| CN | 116521693 | A | * | 8/2023 ......... G06F 16/2282 |
| CN | 117194579 | | | 12/2023 |

* cited by examiner

*Primary Examiner* — Maher N Algibhah
(74) *Attorney, Agent, or Firm* — Fish & Richardson P.C.

(57) ABSTRACT

This specification discloses example distributed table lock application methods and apparatuses, storage media, and electronic devices. In an example method, a master node receives a data processing request and determines a data table that to-be-processed data corresponding to the data processing request are located in. The master node generates a table lock for the data table; performs a lock operation on the data table and generates lock status information corresponding to the data table; writes the lock status information into a local log of the master node and synchronizes the log to a slave node such that the slave node stores the log. After the master node restarts, determines whether the master node stores the log; and in response to that the master node stores the log, restores the lock operation on the data table based on the lock status information recorded in the log.

13 Claims, 5 Drawing Sheets

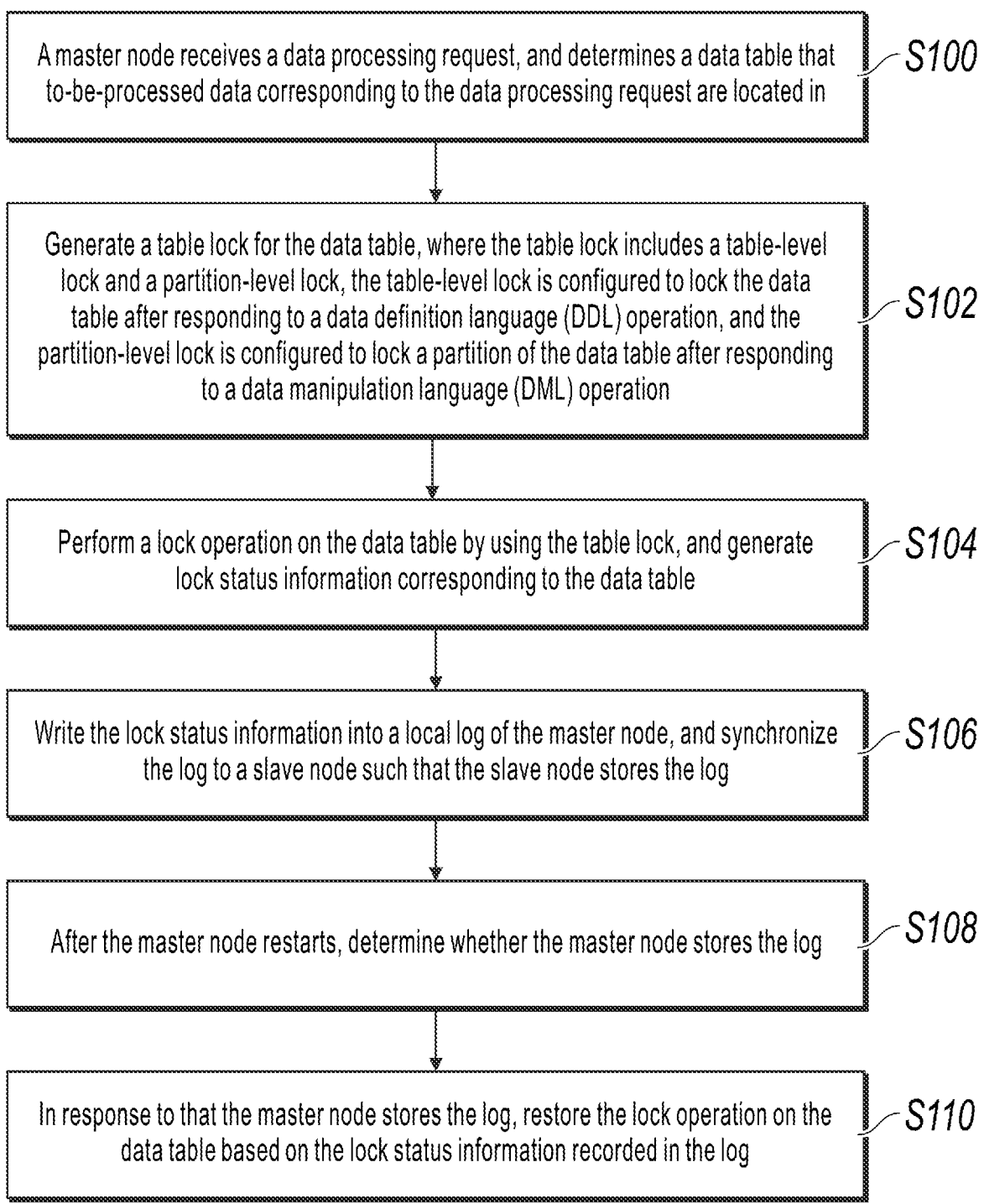

A master node receives a data processing request, and determines a data table that to-be-processed data corresponding to the data processing request are located in — S100

Generate a table lock for the data table, where the table lock includes a table-level lock and a partition-level lock, the table-level lock is configured to lock the data table after responding to a data definition language (DDL) operation, and the partition-level lock is configured to lock a partition of the data table after responding to a data manipulation language (DML) operation — S102

Perform a lock operation on the data table by using the table lock, and generate lock status information corresponding to the data table — S104

Write the lock status information into a local log of the master node, and synchronize the log to a slave node such that the slave node stores the log — S106

After the master node restarts, determine whether the master node stores the log — S108

In response to that the master node stores the log, restore the lock operation on the data table based on the lock status information recorded in the log — S110

FIG. 1

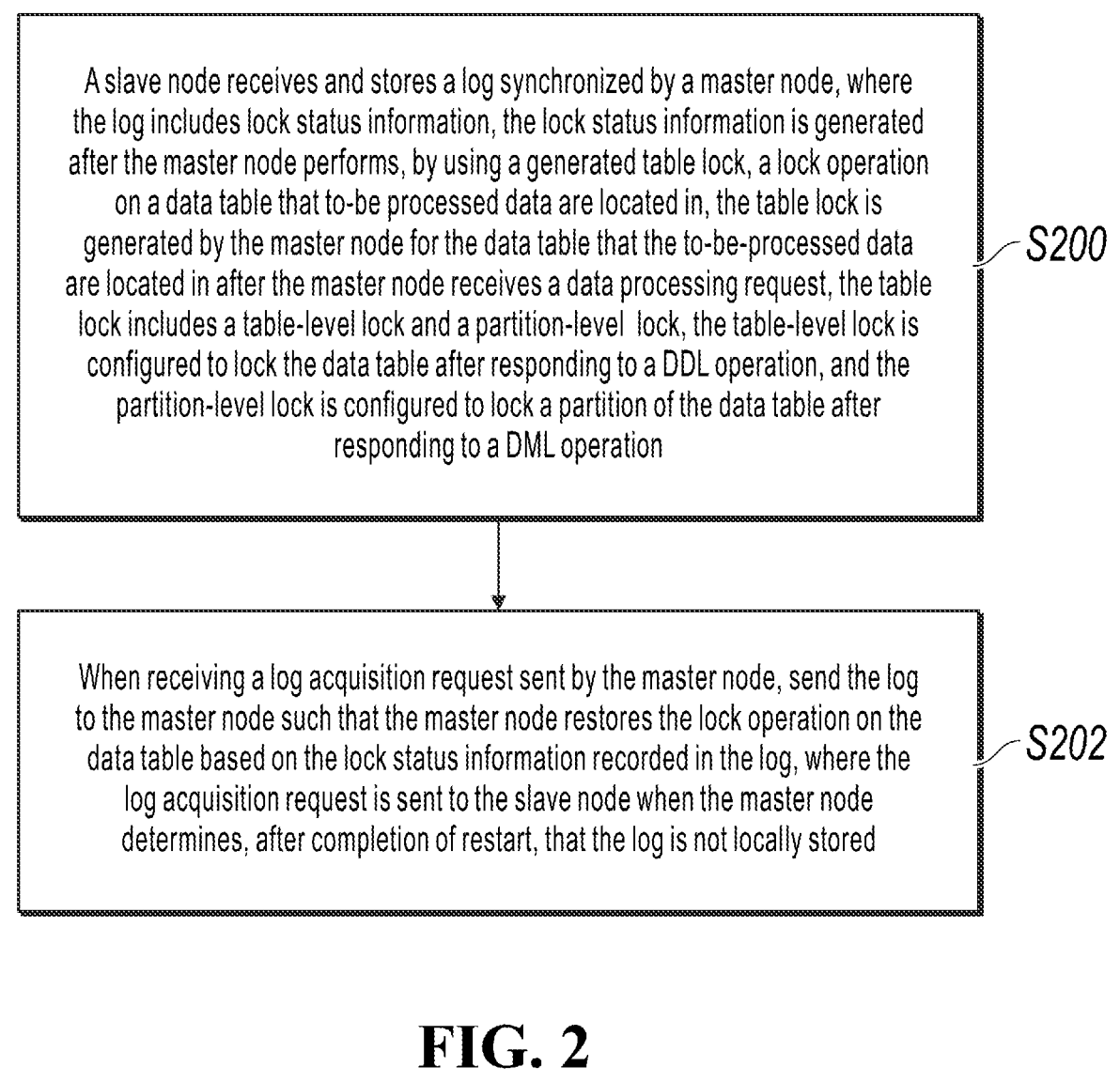

A slave node receives and stores a log synchronized by a master node, where the log includes lock status information, the lock status information is generated after the master node performs, by using a generated table lock, a lock operation on a data table that to-be processed data are located in, the table lock is generated by the master node for the data table that the to-be-processed data are located in after the master node receives a data processing request, the table lock includes a table-level lock and a partition-level lock, the table-level lock is configured to lock the data table after responding to a DDL operation, and the partition-level lock is configured to lock a partition of the data table after responding to a DML operation — S200

When receiving a log acquisition request sent by the master node, send the log to the master node such that the master node restores the lock operation on the data table based on the lock status information recorded in the log, where the log acquisition request is sent to the slave node when the master node determines, after completion of restart, that the log is not locally stored — S202

FIG. 2

DISTRIBUTED TABLE LOCK APPLICATION METHODS, APPARATUSES, STORAGE MEDIA, AND ELECTRONIC DEVICES

CROSS-REFERENCE TO RELATED APPLICATIONS

This application claims priority to Chinese Patent Application No. 202211313874.3, filed on Oct. 25, 2022, which is hereby incorporated by reference in its entirety.

TECHNICAL FIELD

This specification relates to the field of computer technologies, and in particular, to distributed table lock application methods and apparatuses, storage media, and electronic devices.

BACKGROUND

In a distributed data system, a task that is being processed is usually split into a plurality of subtasks such that these subtasks are allocated to different computers for processing so as to improve processing efficiency. In such a process, to avoid a read/write failure of a database when a plurality of processes simultaneously operate one piece of data in the database (for example, modifying a piece of data in the database), data in the database are usually locked. To be specific, when a process operates data in the database, the database locks the data so as to prevent another process from operating the data at a current moment.

However, a current data lock mechanism cannot effectively ensure a lock operation on the data, possibly causing a read/write failure of the database, and further causing a failure to execute a data processing task.

SUMMARY

This specification provides distributed table lock application methods and apparatuses, storage media, and electronic devices, so as to effectively ensure a lock operation on data.

The following technical solutions are used in this specification.

This specification provides a distributed table lock application method, where the method is applied to a master node in a distributed database, and includes: the master node receives a data processing request, and determines a data table that to-be-processed data corresponding to the data processing request are located in; generating a table lock for the data table, where the table lock includes a table-level lock and a partition-level lock, the table-level lock is configured to lock the data table after responding to a data definition language (DDL) operation, and the partition-level lock is configured to lock a partition of the data table after responding to a data manipulation language (DML) operation; performing a lock operation on the data table by using the table lock, and generating lock status information corresponding to the data table; writing the lock status information into a local log of the master node, and synchronizing the log to a slave node such that the slave node stores the log; after the master node restarts, determining whether the master node stores the log; and in response to that the master node stores the log, restoring the lock operation on the data table based on the lock status information recorded in the log.

Optionally, the method further includes: sending a table lock generation instruction to the slave node such that the slave node locally generates a table lock for a copy of the data table based on the table lock generation instruction, and after the slave node elects to become a master node, the slave node performs a lock operation on the copy based on the table lock locally generated at the slave node and the log synchronized to the slave node by the master node.

This specification provides a distributed table lock application method, where the method is applied to a slave node in a distributed database, and includes: a receiving module, configured to receive and store a log synchronized by a master node, where the log includes lock status information, the lock status information is generated after the master node performs, by using a generated table lock, a lock operation on a data table that to-be-processed data are located in, the table lock is generated by the master node for the data table that the to-be-processed data are located in after the master node receives a data processing request, the table lock includes a table-level lock and a partition-level lock, the table-level lock is configured to lock the data table after responding to a DDL operation, and the partition-level lock is configured to lock a partition of the data table after responding to a DML operation; and when receiving a log acquisition request sent by the master node, sending the log to the master node such that the master node restores the lock operation on the data table based on the lock status information recorded in the log, where the log acquisition request is sent to the slave node when the master node determines, after completion of restart, that the log is not locally stored.

Optionally, the method further includes: receiving a table lock generation instruction sent by the master node; locally generating a table lock for a copy of the data table at the slave node based on the table lock generation instruction; after the master node is faulty, sending, to remaining nodes, an election request that the slave node elects to become a master node; and in response to that the slave node elects to become a master node, performing a lock operation on the copy of the data table based on the table lock generated by the slave node and the lock status information recorded in the log that is synchronized by the master node.

This specification provides a distributed table lock application apparatus, including: a receiving module, configured to receive a data processing request, and determine a data table that to-be-processed data corresponding to the data processing request are located in; a generation module, configured to generate a table lock for the data table, where the table lock includes a table-level lock and a partition-level lock, the table-level lock is configured to lock the data table after responding to a DDL operation, and the partition-level lock is configured to lock a partition of the data table after responding to a DML operation; an operation module, configured to perform a lock operation on the data table by using the table lock, and generate lock status information corresponding to the data table; a synchronization module, configured to write the lock status information into a local log of the master node, and synchronize the log to a slave node such that the slave node stores the log; a determination module, configured to: after the master node restarts, determine whether the master node stores the log; and a restoration module, configured to: in response to that the master node stores the log, restore the lock operation on the data table based on the lock status information recorded in the log.

Optionally, the generation module is specifically configured to send a table lock generation instruction to the slave node such that the slave node locally generates a table lock for a copy of the data table based on the table lock generation instruction, and after the slave node elects to become a master node, the slave node performs a lock operation on the copy based on the table lock locally generated at the slave node and the log synchronized to the slave node by the master node.

This specification provides a distributed table lock application apparatus, including: a receiving module, configured to receive and store a log synchronized by a master node, where the log includes lock status information, the lock status information is generated after the master node performs, by using a generated table lock, a lock operation on a data table that to-be-processed data are located in, the table lock is generated by the master node for the data table that the to-be-processed data are located in after the master node receives a data processing request, the table lock includes a table-level lock and a partition-level lock, the table-level lock is configured to lock the data table after responding to a DDL operation, and the partition-level lock is configured to lock a partition of the data table after responding to a DML operation; and a sending module, configured to: when receiving a log acquisition request sent by the master node, send the log to the master node such that the master node restores the lock operation on the data table based on the lock status information recorded in the log, where the log acquisition request is sent to the slave node when the master node determines, after completion of restart, that the log is not locally stored.

Optionally, the receiving module is further configured to receive a table lock generation instruction sent by the master node; locally generate a table lock for a copy of the data table at the slave node based on the table lock generation instruction; after the master node is faulty, send, to remaining nodes, an election request that the slave node elects to become a master node; and in response to that the slave node elects to become a master node, perform a lock operation on the copy of the data table based on the table lock generated by the slave node and the lock status information recorded in the log that is synchronized by the master node.

This specification provides a computer-readable storage medium, where the storage medium stores a computer program, and the computer program is executed by a processor to implement the above-mentioned distributed table lock application method.

This specification provides an electronic device, including a memory, a processor, and a computer program that is stored in the memory and that can run on the processor, where the processor executes the program to implement the above-mentioned distributed table lock application method.

At least one of the above-mentioned technical solutions used in this specification can achieve the following beneficial effects:

In this solution, a master node receives a data processing request and determines a data table that to-be-processed data corresponding to the data processing request are located in; generates a table lock for the data table; performs a lock operation on the data table and generates lock status information corresponding to the data table; writes the lock status information into a local log of the master node and synchronizes the log to a slave node such that the slave node stores the log; after the master node restarts, determines whether the master node stores the log; and in response to that the master node stores the log, restores the lock operation on the data table based on the lock status information recorded in the log.

It can be understood from the above-mentioned method that, in this solution, during data processing, the master node generates the table lock of the data table that the to-beprocessed data are located in, and synchronizes the lock status information during data processing to the log. As such, even if the master node restarts or the table lock in the master node is lost, a previous lock operation status can still be restored based on the stored log, thereby avoiding a failure to ensure the lock operation on the data since the master node restarts or the table lock in the master node is lost, preventing the to-be-processed data from being invoked by a plurality of processes during subsequent data processing, and ensuring successful execution of a data processing task.

BRIEF DESCRIPTION OF DRAWINGS

The accompanying drawings described here are intended to provide a further understanding of this specification, and constitute a part of this specification. Some example embodiments of this specification and the descriptions of the example embodiments are intended to explain this specification, and do not constitute an undue limitation on this specification. In the accompanying drawings:

FIG. 1 is a schematic flowchart illustrating a distributed table lock application method, according to this specification;

FIG. 2 is a schematic flowchart illustrating a distributed table lock application method, according to this specification;

DESCRIPTION OF EMBODIMENTS

Figure 3:
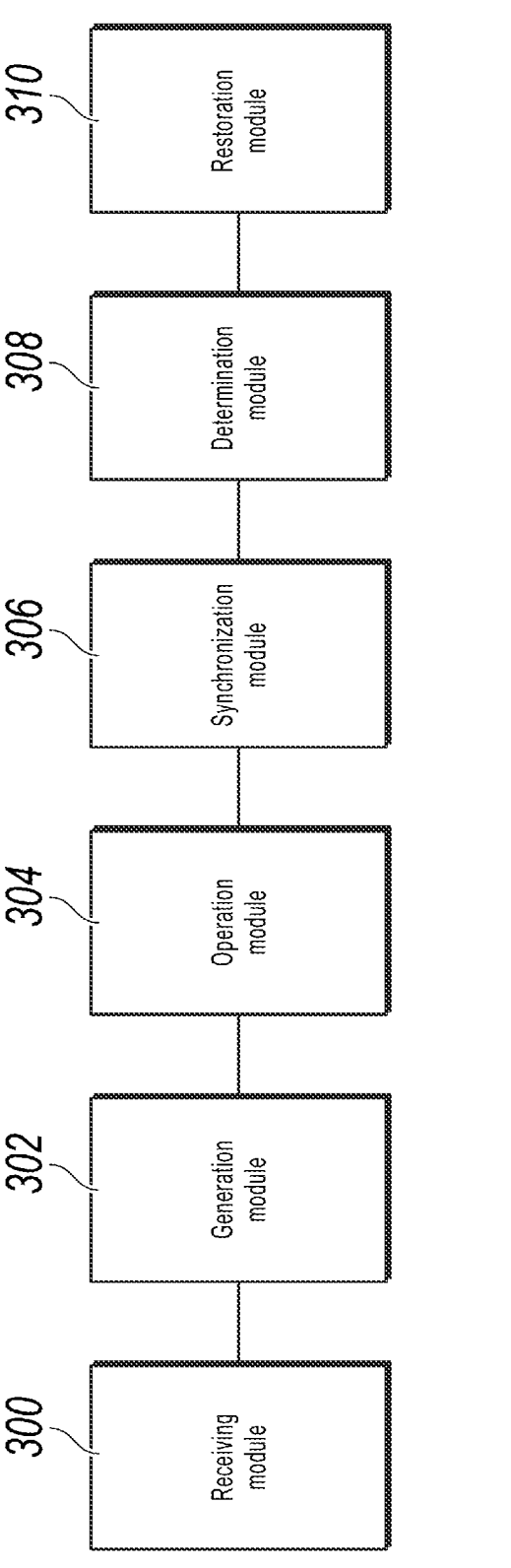
FIG. 3 is a schematic diagram illustrating a distributed table lock application apparatus, according to this specification.

To make the objectives, technical solutions, and advantages of this specification clearer, the following clearly and comprehensively describes the technical solutions of this specification with reference to some specific embodiments and corresponding accompanying drawings of this specification. Clearly, the described embodiments are merely some but not all of embodiments of this specification. All other embodiments obtained by a person of ordinary skill in the art based on some embodiments of this specification without creative efforts shall fall within the protection scope of this specification.

The following describes in detail the technical solutions provided in some embodiments of this specification with reference to the accompanying drawings.

FIG. 1 is a schematic flowchart illustrating a distributed table lock application method, according to this specification. The method includes the following steps:

S100: A master node receives a data processing request, and determines a data table that to-be-processed data corresponding to the data processing request are located in.

In a distributed database system, a task that is being processed is usually split into a plurality of subtasks such that these subtasks are allocated to different computers for processing so as to improve processing efficiency and ensure data privacy security. In such a process, the data system can allocate data related to a current data processing task to a plurality of nodes such that the plurality of nodes jointly execute the task.

During actual execution of the data processing task, for data allocated to one of the nodes, if at least two processes simultaneously process the data (for example, simultaneously delete or modify the data), consistency of the data is lost, causing an error in the database.

Generally, the data in the database are stored in a form of a data table. For data allocated to different nodes, if two pieces of data are stored in the same data table, and when processes of two nodes conflict with each other (for example, one node modifies the data in the data table and the other node deletes the data table), consistency of the data is also lost, causing an error in the database.

To avoid occurrence of the above-mentioned situation, a data lock is usually used to prevent a plurality of threads or processes from simultaneously operating a piece of data in the database or a data table that data are located in. As such, consistency of data in the database is ensured and a database error is avoided. However, since a previous lock operation status (for example, a lock location and a lock method) before the data lock is used cannot be stored, if a node storing the data lock restarts, the data lock cannot restore a lock operation on data or a data table before the restart. Consequently, the restarted node cannot effectively prevent a plurality of processes from simultaneously operating the same piece of data. In addition, once the node storing the data lock is faulty, the data lock of the database is lost, and consequently, consistency of the data in the database cannot be ensured during subsequent data processing.

Based on the above-mentioned description, this specification provides a distributed table lock application method, so as to avoid a case in which consistency of the data in the database cannot be ensured during subsequent data processing since the node storing the data lock restarts or the data lock is lost. When receiving a data processing request, the master node can determine a data table that to-be-processed data corresponding to the data processing request are located in.

A plurality of nodes are disposed in the distributed database system, and these nodes can be designated devices such as computers or servers deployed in the distributed database system. As such, the distributed database system can allocate copies of the to-be-processed data to different nodes. During data processing, one node can be elected from these nodes as a master node, and other nodes except the master node serve as slave nodes. The master node can be configured to dispatch and manage other slave nodes to ensure global consistency of data, and perform a read/write operation on the data in the database. The slave node can be configured to synchronize data of the master node, process a non-transaction-related operation of the data, and forward a transaction operation of the data to the master node. In addition, the slave node can perform a read operation on the data in the database, but cannot perform a write operation. When the master node is faulty and shut down, each slave node can elect to become a new master node. An election method can be set based on an actual situation, which is not specifically limited in this specification.

In addition, the above-mentioned data processing request can be data processing requests corresponding to different processes of the same client device, or can be data processing requests corresponding to different processes of different client devices, or can be data processing requests corresponding to other objects or processes. The data processing request can be a processing request for performing an operation such as deleting, rewriting, or adding data, or can be a processing request for performing an operation such as deleting, setting restrictions, or creating a data table, which is not specifically limited in this specification.

S102: Generate a table lock for the data table.

The data processing procedure generally includes a plurality of phases, such as a preparation (Prepare) phase and a submission (Commit) phase. To ensure data consistency, in the preparation phase for data processing, the master node can generate a table lock for a data table that to-be-processed data are located in. Certainly, the master node can alternatively generate a table lock for the data table immediately after obtaining the to-be-processed data.

Specifically, after obtaining the to-be-processed data, the master node can first locally generate the table lock for the data table, and then send a table lock generation instruction to a plurality of slave nodes. After receiving the table lock generation instruction, the slave node can locally generate a table lock for a copy of the data table so as to back up the table lock in the master node.

Further, the master node can send the table lock generation instruction to each slave node such that each node (including the master node and the slave node) corresponds to one table lock. Certainly, the master node can send the table lock generation instruction to some designated slave nodes only such that the table lock is stored only in these slave nodes.

In this specification, the table lock can include a table-level lock and a partition-level lock. The table-level lock is configured to lock a data table after responding to a data definition language (DDL) operation, and the partition-level lock is configured to lock a partition of the data table after responding to a data manipulation language (DML) operation. The DDL operation is generally used to define or change initialization work such as a link and a constraint among a data table structure, a data type, and a table. The DDL operation is mostly used when a data table is created. After the data table is created, the DDL operation can be used to modify an attribute of the data table, create an index for the data table, or the like. The DML operation is used to perform an operation on the data in the database, for example, insert data into or delete data from a data table. It can be understood that the DML operation is mainly used to modify the data in the data table. SQL instructions are used as an example. Instructions such as CREATE, ALTER, and DROP belong to DDL operations, and instructions such as SELECT, UPDATE, INSERT, and DELETE belong to DML operations.

In this specification, content of a distributed data table can be divided into a plurality of partitions, each partition includes only a part of the content of the data table, and content included in different data table partitions can partially overlap. The distributed database system includes a plurality of nodes, and the plurality of partitions of the data table are distributed on the plurality of nodes. Typically, when disaster recovery backup is not considered, partitions of the data table are respectively located on different nodes. When disaster recovery backup is considered, a primary copy and a secondary copy of the same partition of the data table are respectively located on different nodes, and maintain dynamic data consistency through data synchronization.

In practice, the DDL operation is generally a low frequency operation that aims at an entire data table, and is performed less frequently. The DML operation is a high frequency operation that aims at a local partition in the data table, and is performed more frequently. Corresponding to characteristics of the two types of operations, in this application, a table lock is also split into two levels of structures, i.e., a table-level lock and a partition-level lock. Based on triggering of different operations, a differentiated lock procedure is provided to implement mutually exclusive operations with a more reasonable impact range. Based on the above-mentioned description, when receiving an operation for the distributed data table, the server determines a type of the operation, so as to determine which lock procedure is used subsequently.

S104: Perform a lock operation on the data table by using the table lock, and generate lock status information corresponding to the data table.

Specifically, after the table lock corresponding to the data table is generated, the data table can be locked by using the table lock such that the locked to-be-processed data cannot be invoked or operated by another process except the process corresponding to the current data processing request. For example, if the process corresponding to the current data processing request is performing a modification operation on the to-be-processed data, the master node locks the data table corresponding to the to-be-processed data in the database based on the table lock. As such, another process cannot perform an operation such as deleting, modifying, or setting restrictions on the data table corresponding to the to-be-processed data in the database and the data in the data table at the same moment.

However, if the master node detects that the data processing operation of the current process on the to-be-processed data is completed, the table lock can be used to unlock the previously locked data table such that another process can perform a subsequent operation on the to-be-processed data and the data table that the to-be-processed data are located in.

The above-mentioned example is still used as an example. After the master node detects that the current process completes modification of the to-be-processed data, the table lock can be used to unlock the data table that the to-be-processed data are located in such that another process can perform an operation such as deleting, modifying, or setting restrictions on the data table that the to-be-processed data are located in and the data in the data table.

Generally, after the node storing the table lock restarts or the table lock is lost, the data table is usually restored to a status before the lock operation is performed by using the table lock. For example, when the to-be-processed data are processed, the data table that the to-be-processed data are located in is in a locked state. However, after the node storing the table lock restarts, the data table that the to-be-processed data are located in is restored to an unlocked state when there is no table lock. As such, invoking of the to-be-processed data by another process cannot be prevented, causing a failure to continue the data processing.

Therefore, to avoid occurrence of such a situation, after performing the lock operation on the data table that the to-be-processed data are located in, the master node can generate lock status information corresponding to the table lock. The lock status information can include a location, a current status (for example, a locked state or an unlocked state), a lock method, and the like that correspond to the data table locked by using the table lock in the database, and can further include other status information, which is not specifically limited in this specification.

S106: Write the lock status information into a local log of the master node, and synchronize the log to a slave node such that the slave node stores the log.

After determining the lock status information corresponding to the data table, the master node can write the lock status information into the local log of the master node, and synchronize the log to the slave node such that the slave node stores the synchronized log.

In this specification, the master node can add the table lock generation instruction to the above-mentioned log and synchronize the log to the slave node. Then, the slave node can generate a table lock for a copy of the data table based on the table lock generation instruction recorded in the log.

S108: After the master node restarts, determine whether the master node stores the log.

S110: In response to that the master node stores the log, restore the lock operation on the data table based on the lock status information recorded in the log.

In practice, when the master node restarts, the previous table lock is lost. To restore the previous lock operation status, the lock operation on the data table needs to be restored by using the lock status information recorded in the log. There are many reasons for the restart of the node. After the master node receives a restart command and performs a normal restart operation, the locally stored log is not lost. However, after the master node restarts because of some faults (such as a memory fault), these faults may cause the locally stored log to be lost.

Therefore, after the master node restarts, it is necessary to determine whether the master node stores the log. When it is determined that the log is still stored in the master node, the master node can directly restore, based on the lock status information recorded in the local log, the lock operation on the data table that the to-be-processed data are located in.

If it is determined that no log is stored in the master node, it indicates that the log is lost. In such case, the master node can send a log acquisition request to the slave node, and after receiving the log acquisition request, the slave node can return the locally stored log to the master node such that the master node restores, based on the lock status information recorded in the log, the lock operation on the data table that the to-be-processed data are located in. For example, if the data table that the to-be-processed data are located in has been locked by using the table lock before the master node restarts, after the restart, the master node can restore, by using the table lock based on the lock status information recorded in the log sent by the slave node, the lock operation on the data table that the to-be-processed data are located in before the master node restarts.

In such a process, if the log in the master node is lost, the master node can generate a new table lock again based on the lock status information recorded in the log that is synchronized to the master node, and restore a corresponding lock operation status of the data table before the table lock is lost.

However, when the master node is faulty and shut down permanently, it indicates that the master node cannot continue to execute a subsequent data processing task. Therefore, for one of the slave nodes, the slave node can send, to remaining nodes, an election request that the slave node elects to become a master node. If the slave node succeeds in the election, in response to that the slave node elects to become a master node, the slave node can perform a lock operation on a copy of the data table based on the table lock generated by the slave node and the lock status information recorded in the log that is synchronized by the master node. In the distributed database system, when the master node performs processing on the data in the data table, the slave node generates a copy of the data table. As such, when the master node is faulty and after the slave node elects to become a master node, the slave node can continue processing the copy of the data table.

The remaining nodes described above can be other slave nodes in the distributed database system. When it is detected that all states corresponding to the master node within a predetermined time are unresponsive states, it can be considered that the master node is permanently faulty. In such case, a request that one of the slave nodes elects to become a master node can be sent to remaining slave nodes in the distributed database system. The predetermined time can be set based on an actual situation, which is not specifically limited in this specification.

In other words, if the data table is locked by using the table lock before the master node is shut down, after the master node is faulty, and after one of the slave nodes elects to become a master node, the slave node can restore locking of the copy of the data table based on the log synchronized to the local node.

It is worthwhile to note that, in this specification, other types of data locks can be further generated, for example, a data lock for the to-be-processed data only, a row lock for a data row that the to-be-processed data are located in, and a page lock for a data page that the to-be-processed data are located on. When the data lock is the data lock for the to-be-processed data only, a lock operation can be performed on the to-be-processed data only. When the data lock is the row lock, a lock operation can be performed on a data row that the to-be-processed data are located in. When the data lock is the page lock, a lock operation can be performed on a data page that the to-be-processed data are located on. A method for restoring the lock operation is the same as the above-mentioned method for restoring the lock operation on the data table, which is not specifically limited in this specification.

The distributed table lock application method provided in this specification has been described above from a perspective of the master node. For ease of understanding, the following describes the distributed table lock application method provided in this specification from a perspective of one slave node in a distributed database system, as shown in FIG. 2.

FIG. 2 is a schematic flowchart illustrating a data processing method, according to this specification. The method includes the following steps:

S200: A slave node receives and stores a log synchronized by a master node, where the log includes lock status information, the lock status information is generated after the master node performs, by using a generated table lock, a lock operation on a data table that to-be-processed data are located in, the table lock is generated by the master node for the data table that the to-be-processed data are located in after the master node receives a data processing request, the table lock includes a table-level lock and a partition-level lock, the table-level lock is configured to lock the data table after responding to a DDL operation, and the partition-level lock is configured to lock a partition of the data table after responding to a DML operation.

After receiving the data processing request, the master node determines the data table that the to-be-processed data corresponding to the data processing request are located in, and further generates a table lock for the data table that the to-be-processed data are located in. Then, the master node can perform, by using the table lock, a lock operation (for example, locking or unlocking) on the data table that the to-be-processed data are located in, and generate lock status information corresponding to the data table.

S202: When receiving a log acquisition request sent by the master node, send the log to the master node such that the master node restores the lock operation on the data table based on the lock status information recorded in the log, where the log acquisition request is sent to the slave node when the master node determines, after completion of restart, that the log is not locally stored.

After the master node restarts, if the master node still stores the log, the master node can restore, based on the lock status information recorded in the log, the lock operation on the data table that the to-be-processed data are located in. If no log is stored in the master node, the master node can send a log acquisition request to the slave node, and after receiving the log acquisition request, the slave node can return the locally stored log to the master node such that the master node restores, based on the lock status information recorded in the log, the lock operation on the data table.

It can be understood from the above-mentioned method that, it can be understood from the above-mentioned method that, in this solution, during data processing, the master node generates the table lock of the data table that the to-be-processed data are located in, and synchronizes the lock status information during data processing to the log. As such, even if the master node restarts or the table lock in the master node is lost, a previous lock operation status can still be restored based on the stored log, thereby avoiding a failure to ensure the lock operation on the data since the master node restarts or the table lock in the master node is lost, preventing the to-be-processed data from being invoked by a plurality of processes during subsequent data processing, and ensuring successful execution of a data processing task.

The distributed table lock application method in one or more embodiments of this specification has been described above. Based on the same idea, this specification further provides a corresponding distributed table lock application apparatus, as shown in FIG. 3 or FIG. 4.

FIG. 3 is a schematic diagram illustrating a distributed table lock application apparatus, according to this specification. The apparatus includes: a receiving module 300, configured to receive a data processing request, and determine a data table that to-be-processed data corresponding to the data processing request are located in; a generation module 302, configured to generate a table lock for the data table, where the table lock includes a table-level lock and a partition-level lock, the table-level lock is configured to lock the data table after responding to a data definition language (DDL) operation, and the partition-level lock is configured to lock a partition of the data table after responding to a data manipulation language (DML) operation; an operation module 304, configured to perform a lock operation on the data table by using the table lock, and generate lock status information corresponding to the data table; a synchronization module 306, configured to write the lock status information into a local log of the master node, and synchronize the log to a slave node such that the slave node stores the log; a determination module 308, configured to: after the master node restarts, determine whether the master node stores the log; and a restoration module 310, configured to: in response to that the master node stores the log, restore the lock operation on the data table based on the lock status information recorded in the log.

Optionally, the generation module 302 is specifically configured to send a table lock generation instruction to the slave node such that the slave node locally generates a table lock for a copy of the data table based on the table lock generation instruction, and after the slave node elects to become a master node, the slave node performs a lock operation on the copy based on the table lock locally generated at the slave node and the log synchronized to the slave node by the master node.

Figure 4:
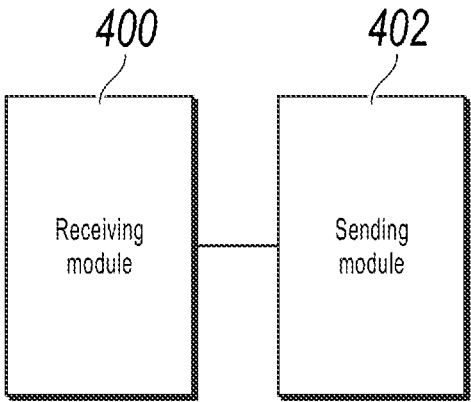
FIG. 4 is a schematic diagram illustrating a distributed table lock application apparatus, according to this specification.

FIG. 4 is a schematic diagram illustrating a distributed table lock application apparatus, according to this specification. The apparatus includes: a receiving module 400, configured to receive and store a log synchronized by a master node, where the log includes lock status information, the lock status information is generated after the master node performs, by using a generated table lock, a lock operation on a data table that to-be-processed data are located in, the table lock is generated by the master node for the data table that the to-be-processed data are located in after the master node receives a data processing request, the table lock includes a table-level lock and a partition-level lock, the table-level lock is configured to lock the data table after responding to a DDL operation, and the partition-level lock is configured to lock a partition of the data table after responding to a DML operation; and a sending module 402, configured to: when receiving a log acquisition request sent by the master node, send the log to the master node such that the master node restores the lock operation on the data table based on the lock status information recorded in the log, where the log acquisition request is sent to the slave node when the master node determines, after completion of restart, that the log is not locally stored.

Optionally, the receiving module 400 is further configured to receive a table lock generation instruction sent by the master node; locally generate a table lock for a copy of the data table at the slave node based on the table lock generation instruction; after the master node is faulty, send, to remaining nodes, an election request that the slave node elects to become a master node; and in response to that the slave node elects to become a master node, perform a lock operation on the copy of the data table based on the table lock generated by the slave node and the lock status information recorded in the log that is synchronized by the master node.

This specification further provides a computer-readable storage medium, where the storage medium stores a computer program, and the computer program can be used to perform the above-mentioned distributed table lock application method provided in FIG. 1 or FIG. 2.

Figure 5:
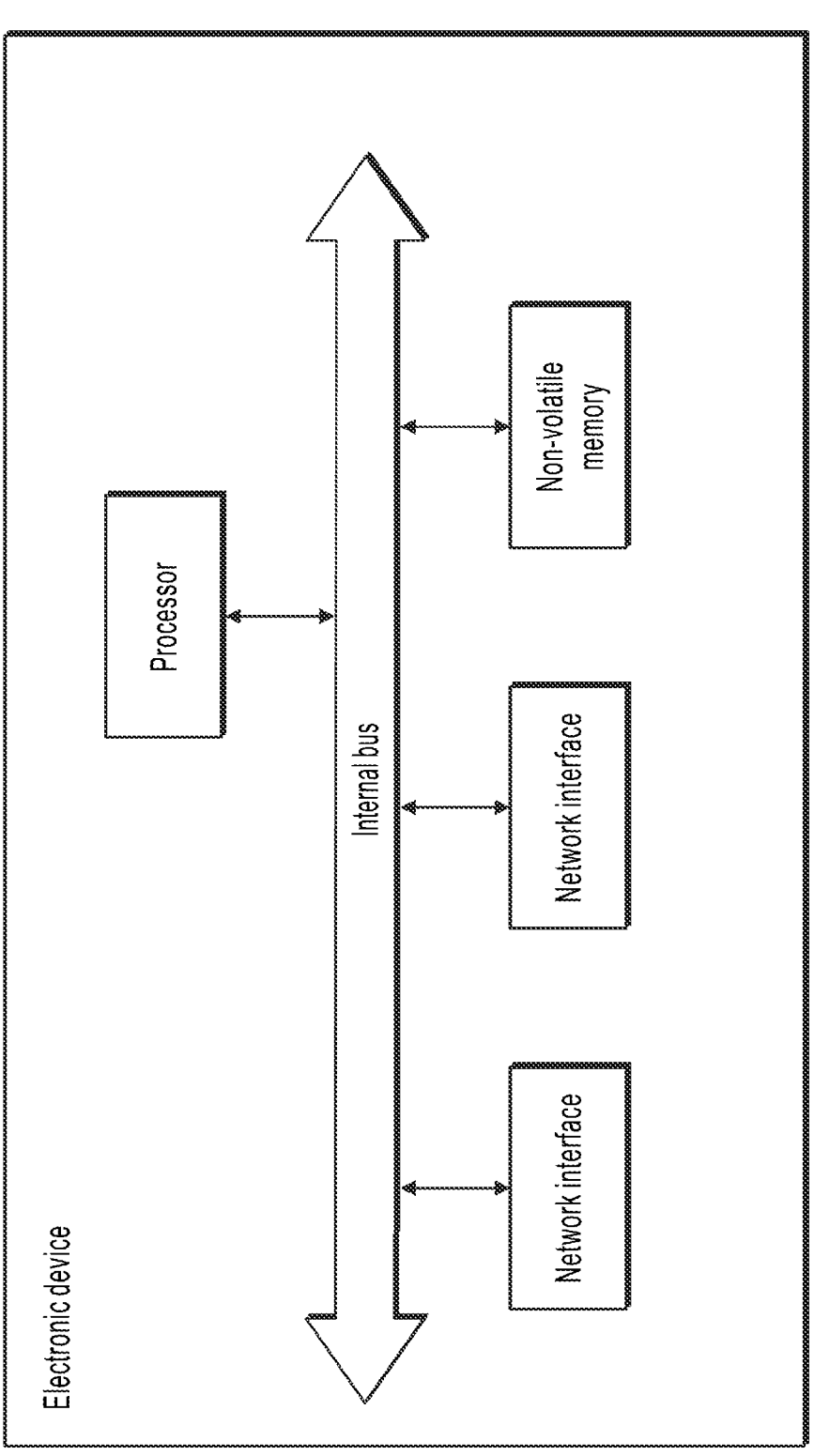
FIG. 5 is a schematic diagram illustrating an electronic device corresponding to FIG. 1 or FIG. 2, according to this specification.

This specification further provides a schematic structural diagram illustrating an electronic device corresponding to FIG. 1 or FIG. 2, as shown in FIG. 5. As shown in FIG. 5, at the hardware level, the electronic device includes a processor, an internal bus, a network interface, a memory, and a non-volatile memory, and may further include other hardware needed by a service. The processor reads a corresponding computer program from the non-volatile memory to the memory and then runs the computer program to implement the above-mentioned distributed table lock application method in FIG. 1 or FIG. 2. Certainly, in addition to software implementations, this specification does not preclude other implementations, such as a logic device or a combination of software and hardware. In other words, an execution body of the following processing procedure is not limited to each logical unit, and can be hardware or a logic device.

In the 1990s, whether a technical improvement is a hardware improvement (for example, an improvement to a circuit structure, such as a diode, a transistor, or a switch) or a software improvement (an improvement to a method procedure) can be clearly distinguished. However, as technologies develop, current improvements to many method procedures can be considered as direct improvements to hardware circuit structures. A designer usually programs an improved method procedure into a hardware circuit to obtain a corresponding hardware circuit structure. Therefore, a method procedure can be improved using a hardware entity module. For example, a programmable logic device (PLD) (for example, a field programmable gate array (FPGA)) is such an integrated circuit, and a logical function of the programmable logic device is determined by a user through device programming. The designer performs programming to "integrate" a digital system to a PLD without requesting a chip manufacturer to design and produce an application-specific integrated circuit chip. In addition, at present, instead of manually manufacturing an integrated circuit chip, this type of programming is mostly implemented by using "logic compiler" software. The programming is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog are most commonly used. A person skilled in the art should also understand that a hardware circuit that implements a logical method procedure can be readily obtained once the method procedure is logically programmed by using the some described hardware description languages and is programmed into an integrated circuit.

A controller can be implemented by using any appropriate method. For example, the controller can be a microprocessor or a processor, or a computer-readable medium that stores computer-readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicone Labs C8051F320. The memory controller can also be implemented as a part of the control logic of the memory. A person skilled in the art also knows that, in addition to implementing the controller by using only the computer-readable program code, logic programming can be performed on method steps to enable the controller to implement the same function in forms of the logic gate, the switch, the application-specific integrated circuit, the programmable logic controller, the embedded microcontroller, etc. Therefore, the controller can be considered as a hardware component, and an apparatus included in the controller for implementing various functions can also be considered as a structure in the hardware component. Alternatively, the apparatus configured to implement various functions can even be considered as both a software module implementing the method and a structure in the hardware component.

The system, apparatus, module, or unit illustrated in the above-mentioned embodiments can be specifically implemented by using a computer chip or an entity, or can be implemented by using a product having a specific function. A typical implementation device is a computer. Specifically, for example, the computer can be a personal computer, a laptop computer, a cellular phone, a camera phone, a smart phone, a personal digital assistant, a media player, a navigation device, an e-mail device, a game console, a tablet computer, a wearable device, or any combination of these devices.

For ease of description, the above-mentioned apparatus is described by dividing functions into various units. Certainly, when this specification is implemented, a function of each unit can be implemented in one or more pieces of software and/or hardware.

A person skilled in the art should understand that some embodiments of this specification can be provided as methods, systems, or computer program products. Therefore, this specification can use a form of hardware only embodiments, software only embodiments, or embodiments with a combination of software and hardware. Moreover, this specification can use a form of a computer program product that is implemented on one or more computer-usable storage media (including but not limited to a disk memory, a CD-ROM, an optical memory, etc.) that include computer-usable program code.

This specification is described with reference to the flowcharts and/or block diagrams of the method, the device (system), and the computer program product according to some embodiments of this specification. It should be understood that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so the instructions executed by the computer or the processor of the another programmable data processing device generate an apparatus for implementing a specific function in one or more processes in the flowcharts and/or in one or more blocks in the block diagrams.

These computer program instructions can be stored in a computer-readable memory that can instruct the computer or the another programmable data processing device to work in a specific way, so the instructions stored in the computer-readable memory generate an artifact that includes an instruction apparatus. The instruction apparatus implements a specific function in one or more processes in the flowcharts and/or in one or more blocks in the block diagrams.

These computer program instructions can alternatively be loaded onto the computer or another programmable data processing device such that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more processors (CPUs), one or more input/output interfaces, one or more network interfaces, and one or more memories.

The memory may include a non-persistent memory, a random access memory (RAM), a non-volatile memory, and/or another form that are in a computer-readable medium, for example, a read-only memory (ROM) or a flash memory (flash RAM). The memory is an example of the computer-readable medium.

The computer-readable medium includes a persistent and a non-persistent, a removable and a non-removable medium, which can implement information storage by using any method or technology. Information can be a computer-readable instruction, a data structure, a program module, or other data. Examples of the computer storage medium include but are not limited to a phase change random access memory (PRAM), a static random access memory (SRAM), a dynamic random access memory (DRAM), a random access memory (RAM) of another type, a read-only memory (ROM), an electrically erasable programmable read-only memory (EEPROM), a flash memory or another memory technology, a compact disc read-only memory (CD-ROM), a digital versatile disc (DVD) or another optical storage, a cassette tape, a cassette magnetic disk storage, or another magnetic storage device, or any other non-transmission media, which can be configured to store information that can be accessed by a computing device. Based on the definition in this specification, the computer-readable medium does not include transitory media such as a modulated data signal and carrier.

It is worthwhile to further note that, the terms "include", "comprise", or any other variant thereof are intended to cover a non-exclusive inclusion such that a process, a method, a product or a device that includes a list of elements not only includes those elements but also includes other elements which are not expressly listed, or further includes elements inherent to such process, method, product or device. Without more constraints, an element preceded by "includes a . . . " does not preclude the existence of additional identical elements in the process, method, product or device that includes the element.

A person skilled in the art should understand that some embodiments of this specification can be provided as methods, systems, or computer program products. Therefore, this specification can use a form of hardware only embodiments, software only embodiments, or embodiments with a combination of software and hardware. Moreover, this specification can use a form of a computer program product that is implemented on one or more computer-usable storage media (including but not limited to a disk memory, a CD-ROM, an optical memory, etc.) that include computer-usable program code.

This specification can be described in the general context of computer-executable instructions to be executed by a computer, for example, a program module. Generally, the program module includes a routine, a program, an object, a component, a data structure, etc. executing a specific task or implementing a specific abstract data type. This specification can alternatively be practiced in distributed computing environments. In the distributed computing environments, tasks are performed by remote processing devices connected through a communication network. In the distributed computing environments, the program module can be located in a local and remote computer storage medium including a storage device.

Some embodiments of this specification are described in a progressive way. For same or similar parts of some embodiments, mutual references can be made to the embodiments. Each embodiment focuses on a difference from other embodiments. Particularly, some system embodiments are briefly described since they are basically similar to some method embodiments. For related parts, references can be made to related descriptions in some method embodiments.

The above-mentioned descriptions are merely some embodiments of this specification and are not intended to limit this specification. A person skilled in the art can make various changes and variations to this specification. Any modification, equivalent replacement, or improvement made without departing from the spirit and principle of this specification shall fall within the scope of the claims in this specification.

What is claimed is:

1. A computer-implemented method, comprising:

receiving, by a master node in a distributed database, a data processing request, wherein the data processing request indicates an operation on a data table that to-be-processed data corresponding to the data processing request are located in;

determining the data table based on the data processing request;

determining a type of the operation indicated by the data processing request, wherein the type of the operation is one of a data definition language (DDL) operation and a data manipulation language (DML) operation;

generating a table lock for the data table based on the type of the operation, wherein the table lock comprises a table-level lock when the operation is determined to be a DDL operation or a partition-level lock when the operation is determined to be a DML operation, the table-level lock is configured to lock the data table after responding to a DDL operation, and the partition-level lock is configured to lock a partition of the data table after responding to a DML operation;

performing a lock operation on the data table by using the table lock;

generating lock status information corresponding to the data table;

writing the lock status information into a log of the master node; and synchronizing the log to a slave node for the slave node to store the log.

2. The computer-implemented method according to claim 1, further comprising:

after the master node restarts, determining whether the master node stores the log; and in response to that the master node stores the log, restoring the lock operation on the data table based on the lock status information recorded in the log.

3. The computer-implemented method according to claim 1, further comprising:

sending a table lock generation instruction to the slave node for the slave node to locally generate a table lock for a copy of the data table based on the table lock generation instruction, wherein after the slave node elects to become a master node, the slave node performs a lock operation on the copy based on the table lock locally generated at the slave node and the log synchronized to the slave node by the master node.

4. A computer-implemented method, comprising:

receiving and storing, by a slave node in a distributed database, a log synchronized by a master node in the distributed database, wherein the log comprises lock status information, the lock status information is generated after the master node performs, by using a table lock, a lock operation on a data table that to-be-processed data are located in, the table lock is generated for the data table based on a type of an operation on the data table in response to a data processing request indicating the operation on the data table and after a determination of the type of the operation indicated by the data processing request is one of a data definition language (DDL) operation and a data manipulation language (DML) operation, the table lock comprises a table-level lock when the operation is determined to be a DDL operation or a partition-level lock when the operation is determined to be a DML operation, the table-level lock is configured to lock the data table after responding to a DDL operation, and the partition-level lock is configured to lock a partition of the data table after responding to a DML operation; and in response to receiving a log acquisition request from the master node, sending the log to the master node for the master node to restore the lock operation on the data table based on the lock status information recorded in the log, wherein the log acquisition request is received by the slave node in response to that the master node determines, after completion of restart, that the log is not locally stored.

5. The computer-implemented method according to claim 4, further comprising:

receiving a table lock generation instruction from the master node; and locally generating a table lock for a copy of the data table at the slave node based on the table lock generation instruction.

6. The computer-implemented method according to claim 5, further comprising:

after the master node is faulty, sending, to remaining nodes, an election request that the slave node elects to become a master node; and in response to that the slave node elects to become a master node, performing a lock operation on the copy of the data table based on the table lock generated by the slave node and the lock status information recorded in the log that is synchronized by the master node.

7. A computer-implemented system for a distributed database, comprising:

a master node and a slave node, wherein the master node is configured to:

receive a data processing request, wherein the data processing request indicates an operation on a data table that to-be-processed data corresponding to the data processing request are located in;

determine the data table based on the data processing request;

determine a type of the operation indicated by the data processing request, wherein the type of the operation is one of a data definition language (DDL) operation and a data manipulation language (DML) operation;

generate a table lock for the data table based on the type of the operation, wherein the table lock comprises a table-level lock when the operation is determined to be a DDL operation or a partition-level lock when the operation is determined to be a DML operation, the table-level lock is configured to lock the data table after responding to a DDL operation, and the partition-level lock is configured to lock a partition of the data table after responding to a DML operation;

perform a lock operation on the data table by using the table lock;

generate lock status information corresponding to the data table;

write the lock status information into a log of the master node; and synchronizing the log to the slave node;

after the master node restarts, determine whether the master node stores the log; and in response to that the master node stores the log, restore the lock operation on the data table based on the lock status information recorded in the log; and wherein the slave node is configured to:

receive and store the log synchronized by the master node, wherein the log comprises the lock status information.

8. The computer-implemented system according to claim 7, wherein the master node is configured to:

send a table lock generation instruction to the slave node for the slave node to locally generate a table lock for a copy of the data table based on the table lock generation instruction.

9. The computer-implemented system according to claim 8, wherein the slave node is configured to:

after the slave node elects to become a master node, perform a lock operation on the copy based on the table lock locally generated at the slave node and the log synchronized to the slave node by the master node.

10. The computer-implemented system according to claim 7, wherein the master node is configured to:

receive an operation for the data table;

determine a type of the operation; and determine which lock procedure to be used based on type of the operation.

11. The computer-implemented system according to claim 7, wherein the slave node is configured to:

in response to receiving a log acquisition request from the master node, send the log to the master node for the master node to restore the lock operation on the data table based on the lock status information recorded in the log, wherein the log acquisition request is received by the slave node in response to that the master node determines, after completion of restart, that the log is not locally stored.

12. The computer-implemented system according to claim 7, wherein the slave node is configured to:

receive a table lock generation instruction from the master node; and locally generate a table lock for a copy of the data table at the slave node based on the table lock generation instruction.

13. The computer-implemented system according to claim 12, wherein the slave node is configured to:

after the master node is faulty, send, to remaining nodes, an election request that the slave node elects to become a master node; and in response to that the slave node elects to become a master node, perform a lock operation on the copy of the data table based on the table lock generated by the slave node and the lock status information recorded in the log that is synchronized by the master node.

* * * * *